United States Patent [19]

Suzuki et al.

[11] Patent Number: 5,209,558
[45] Date of Patent: May 11, 1993

[54] VEHICULAR HEADLAMP

[75] Inventors: Takanori Suzuki; Kiyoshi Sato, both of Shizuoka, Japan

[73] Assignee: Koito Manufacturing Co., Ltd., Tokyo, Japan

[21] Appl. No.: 857,846

[22] Filed: Mar. 26, 1992

[30] Foreign Application Priority Data

Apr. 5, 1991 [JP] Japan .................. 3-099758

[51] Int. Cl.⁵ .............................................. B60Q 1/06
[52] U.S. Cl. ..................... 362/66; 362/243; 362/250; 362/289; 362/310
[58] Field of Search ............... 362/66, 242, 243, 249, 362/250, 285, 287, 289, 310

[56] References Cited

U.S. PATENT DOCUMENTS 5,016,155  5/1991  Chevance .................. 362/285 X

*Primary Examiner*—Stephen F. Husar
*Attorney, Agent, or Firm*—Sughrue, Mion, Zinn Macpeak & Seas

[57] ABSTRACT

A vehicular headlamp in which both a main beam unit and a sub-beam unit are supported by a single supporting member for aiming which is disposed within a lamp room defined by a headlamp body and an outer lens mounted on the lamp body for covering a front opening of the lamp body.

10 Claims, 9 Drawing Sheets

VEHICULAR HEADLAMP

BACKGROUND OF THE INVENTION

1. Field of the Invention

The present invention relates generally to a vehicular headlamp, and more particularly to a headlamp for a vehicle in which both a main beam unit for radiating a main running beam and sub-beam unit for radiating a sub-beam are supported by a single pivotable supporting member to simplify the headlamp.

2. Related Art

In the conventional vehicular headlamp having a main beam unit and a sub-beam unit, these two units are pivotably supported on a lamp body for aiming separately and independently.

According to the conventional vehicular headlamp of this type, since the main beam unit and sub-beam unit are separately supported, two different supporting members and two pairs of aiming mechanisms have been employed and, accordingly, large lamp room for accommodating these two members and two pairs of mechanisms has been required. This suffers from a problem that the headlamp body itself becomes large in size and further a structure has been complicated.

SUMMARY OF THE INVENTION

The present invention has been made in view of the foregoing problems accompanying the conventional headlamp. Therefore, an object of the invention is to provide a compact vehicular headlamp and which is simple in structure.

The above and other objects of the invention can be achieved by a provision of a vehicular headlamp in which, according to the present invention, both a main beam unit and a sub-beam unit are supported by a single supporting member for aiming which is disposed within a lamp room defined by a headlamp body and an outer lens mounted on the lamp body for covering a front opening of the lamp body.

According to the present invention, since both the main beam unit and the sub-beam unit are supported by a single supporting member, the headlamp requires merely one pair of aiming mechanism, so that a supporting mechanism can be made simple in structure, and as a result a compact headlamp can be manufactured.

DESCRIPTION OF THE PREFERRED EMBODIMENTS

Preferred embodiments of the present invention will now be described with reference to accompanying drawings.

Figure 1:
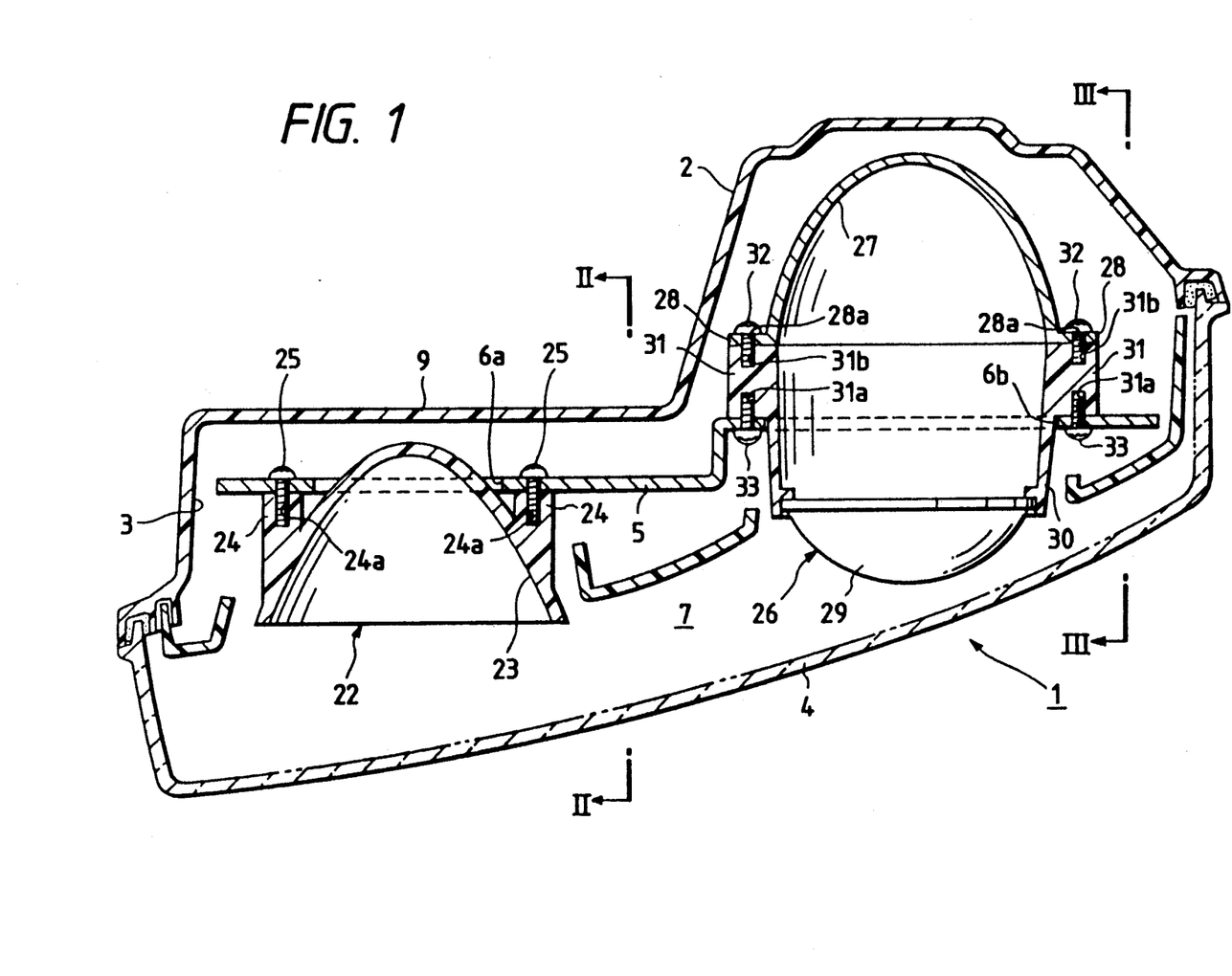
FIG. 1 is a horizontal sectional view showing a vehicular headlamp according to the first embodiment of the invention.
Figure 2:
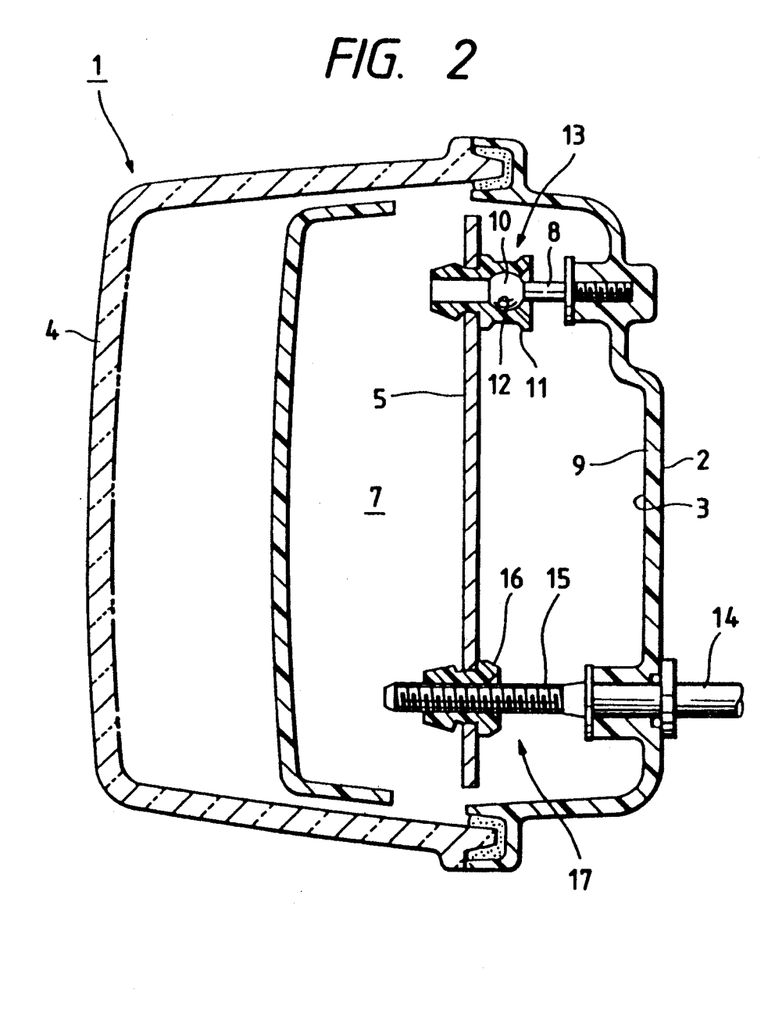
FIG. 2 is an enlarged sectional view cut along a line II—II in FIG. 1.
Figure 3:
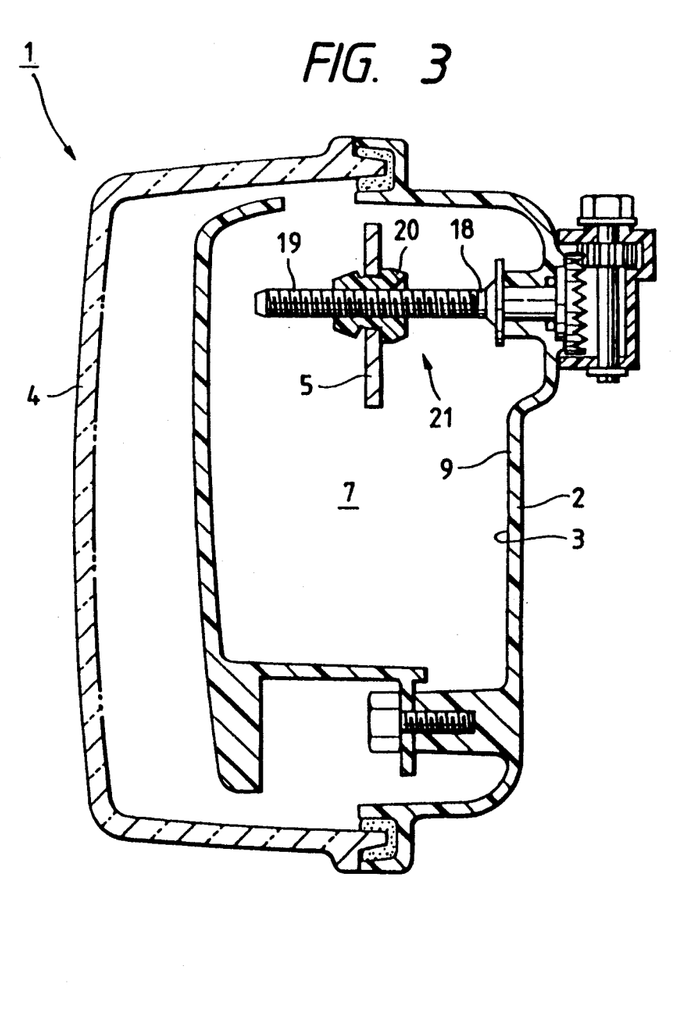
FIG. 3 is an enlarged sectional view cut along a line III—III in FIG. 1.

FIGS. 1-3 show a vehicular headlamp according to the first embodiment of the invention. More specifically, FIG. 1 is a horizontal sectional view showing a vehicular headlamp according to the first embodiment of the invention, FIG. 2 is an enlarged sectional view cut along a line II—II in FIG. 1, and FIG. 3 is an enlarged sectional view cut along a line III—III in FIG. 1

A headlamp 1 is provided with a box-like lamp body 2 formed of a synthetic resin and having a concave portion 3 laterally elongating. An outer lens (cover) 4 is mounted on the lamp body 2 to cover a front opening of the concave portion 3. A plate-like bracket 5 is provided with a pair of mounting holes 6a, 6b which are substantially circular shaped at a left and right position thereof as spaced apart from each other. The bracket 5 is pivotably disposed within a lamp room 7 defined by the lamp body 2 and the outer lens 4. A pivot axis 8 is fixedly connected on a back wall 9 of the lamp body 2 at an upper and substantially center position in the lateral direction thereof, in such a manner that the pivot axis 8 protrudes forwardly. A ball member 10 is unitary formed with a front end of the pivot axis 8. The ball member 10 is rotatably fitted in a concave part 12 having a concave spherical surface of a receiving member 11 supported on a back of the bracket 5 at an upper center position thereof, so that the ball member 10 performs as a pivot point 13.

As shown in FIG. 2, an adjusting shaft 14 having a threaded portion 15 at a front half thereof is rotatably supported on a back wall 9 of the lamp body 2 at a position lower than the position on which the pivot axis 8 is supported. On the other hand, a nut member 16 is supported on the bracket 5 at a position lower than the position on which the receiving member 11 is supported within which nut the threaded portion 15 of the adjusting shaft 14 is threadably engaged. The adjusting shaft 14 and the nut member 16 act as a vertical aiming mechanism 17.

As shown in FIG. 3, an adjusting shaft 18 has a threaded portion 19 at a front half thereof similar to the adjusting shaft 14. The adjusting shaft 18 is rotatably supported on the back wall 9 of the lamp body 2 at a right most position thereof horizontally spaced apart from the position on which the pivot axis 8 is supported. The threaded portion 19 of the adjusting shaft 18 is threadably engaged within a nut member 20, to thereby perform as a lateral aiming mechanism 21.

When the adjusting shaft 14 of the vertical aiming mechanism 17 is operated to rotate, the bracket 5 vertically pivots along a pivot axis connecting between the receiving member 11 of the pivot point 13 and the nut member 20 of the lateral aiming mechanism 21. On the other hand, when the adjusting shaft 18 of the lateral aiming mechanism 21 is operated to rotate, the bracket laterally pivots along a pivot axis connecting between the receiving member 11 of the pivot point 13 and the nut member 16 of the vertical aiming mechanism 17. Thus, the bracket 5 performs as a supporting member.

A main beam unit 22 employs a known parabolic reflector 23. A filament (now shown) of a bulb is disposed on a focal point of the reflector 23. A pair of protruding parts 24 protrude from a back surface of the reflector 23 and provided with a thread hole 24a at a rear surface thereof. The reflector 23 is supported on the bracket 5 in such a manner that a rear part of the reflector 23 passes through a mounting hole 6a of the bracket, and a pair of screws 25 are engaged in the respective thread hole 24a from behind through the bracket 5 as shown in FIG. 1.

A sub-beam unit 26 is constituted by a so-called projection type lamp which is generally provided with an elliptic reflector having high light condensibility, a shade for cutting off a part of light reflected by the reflector and a projection lens which is located within a focal point region of the reflector. The projection type lamp is disclosed in detail in, for example, Unexamined Japanese Patent Applications (OPI) Nos. Sho. 62-222502, Sho. 63-40201 and Sho. 63-236201.

According to the first embodiment, as shown in FIG. 1, the sub-beam unit 26 is provided with an elliptic reflector 27 having high light condensibility, a light bulb and a shade which are not shown in the figures. A pair of mounting pieces 28 extend toward outside from an opening end of the reflector 27 and have a respective through hole 28a. The sub-beam unit 26 is also provided with a projection (condenser) lens 29 located in front of the reflector 27 and a short cylindrical holder 30 for connecting the reflector 27 to the projection lens 29. The holder 30 is provided with a pair of mounting protrusions 31 having thread holes 31a at a front and rear ends thereof. The projection lens 29 fits in a front end portion of the holder 30. The reflector 27 is secured to the projection lens 29 through the holder 30 by means of screws 32 which are thread-engaged with the through holes 28a of the mounting pieces 28 of the holder 30.

The sub-beam unit 26 is secured to the bracket 5 by screws 33 which are thread-engaged from the front side with the thread holes 31a of the holder 30. Since the main beam unit 22 and the sub-beam unit 26 are connected to each other by the bracket 5, both the units are operated to incline when aiming by pivoting the bracket 5.

Figure 4:
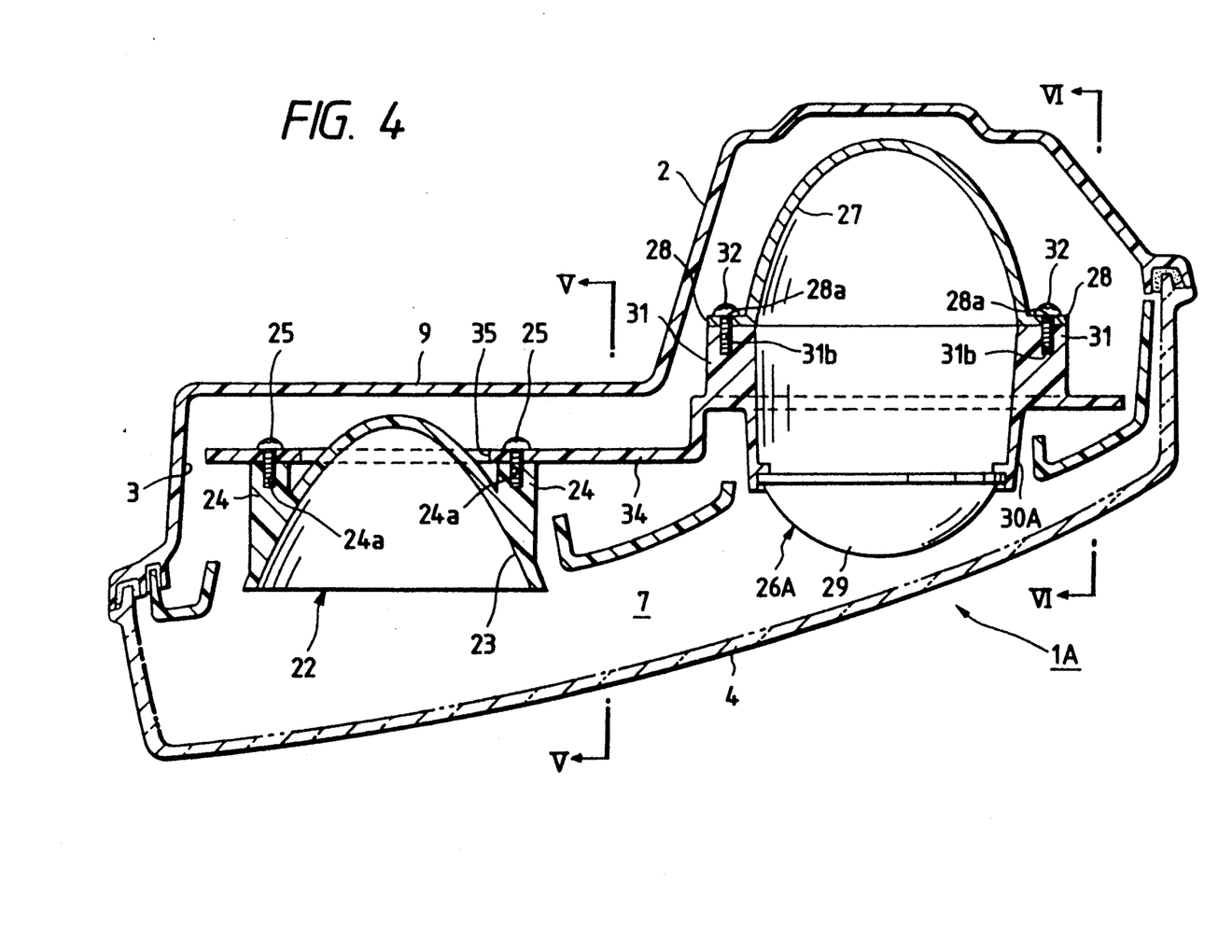
FIG. 4 is a horizontal sectional view showing a vehicular headlamp according to the second embodiment of the invention.
Figure 5:
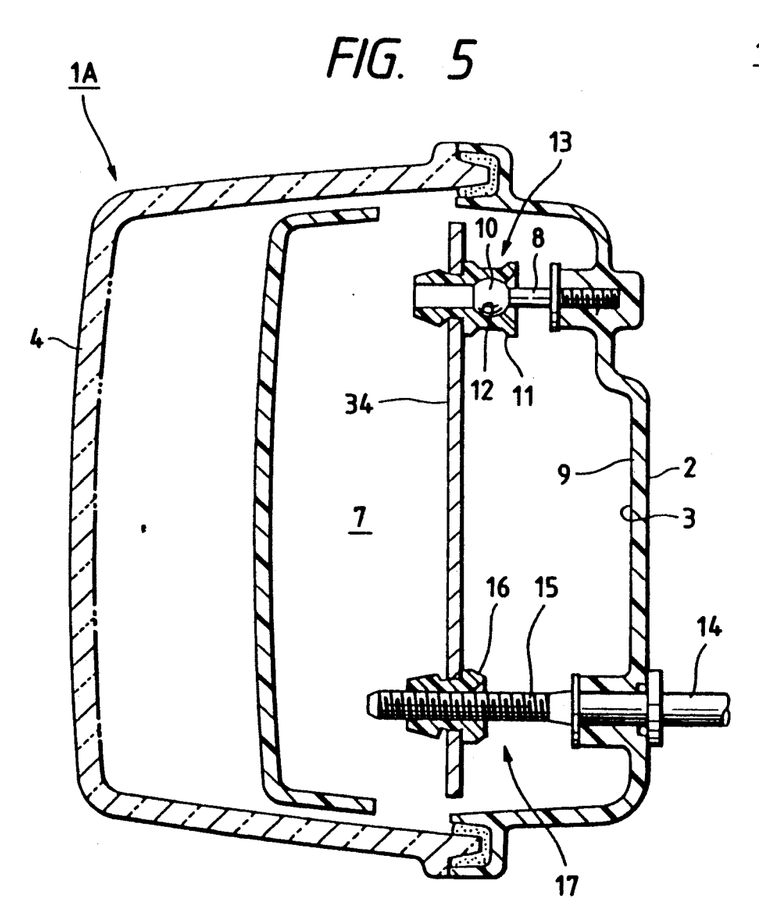
FIG. 5 is an enlarged sectional view cut along a line V—V in FIG. 4.
Figure 6:
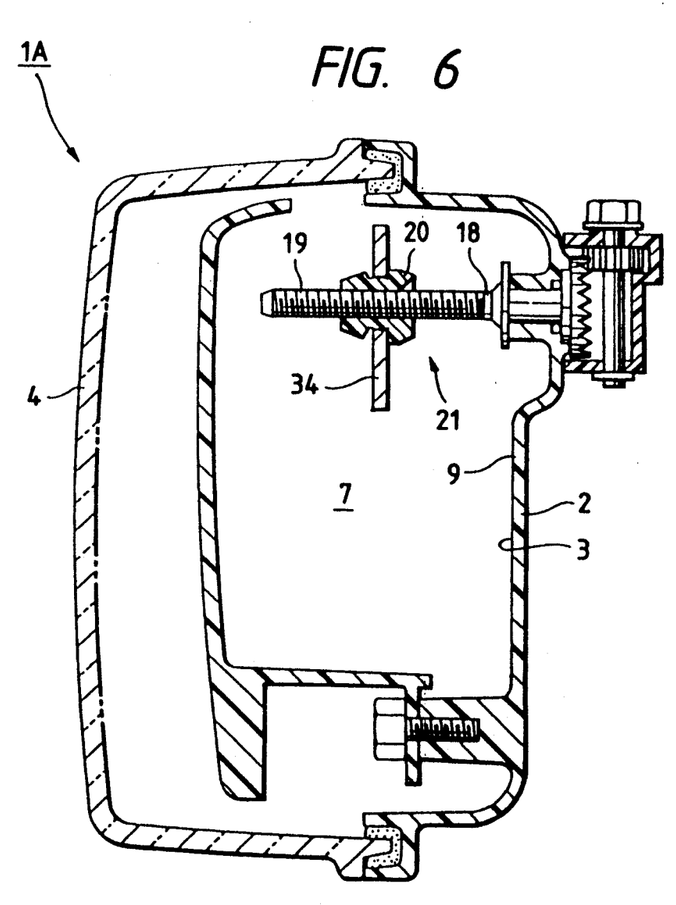
FIG. 6 is an enlarged sectional view cut along a line VI—VI in FIG. 4.

FIGS. 4 through 6 show a vehicular headlamp according to a second embodiment of the invention. More specifically, FIG. 4 is a horizontal sectional view showing a vehicular headlamp according to the second embodiment of the invention, FIG. 5 is an enlarged sectional view cut along a line V—V in FIG. 4, and FIG. 6 is an enlarged sectional view cut along a line VI—VI in FIG. 4.

Because the second embodiment is similar to the first embodiment described above, like parts and components are designated by the same reference numerals and merely different structures are described below.

According to the second embodiment, a holder 30A of a sub-beam unit 26A is provided with a supporting plate portion 34 extending laterally therefrom. The supporting plate portion 34 of the holder 30A performs as a supporting member. The supporting plate portion 34 is provided with a mounting hole 35 through which the main beam unit 22 is mounted. The receiving member 11 and nut members 16 and 20 are supported on the supporting plate portion 34 which engage with respective pivot axis and adjusting shafts as similar to those members of the first embodiment described above.

In the second embodiment thus structured, since the supporting plate portion 34 elongating from the holder 30A of the sub-beam unit 26A performs as a supporting member, required parts are more reduced in number and the manufacturing cost is further lowered accordingly compared to the first embodiment.

Figure 7:
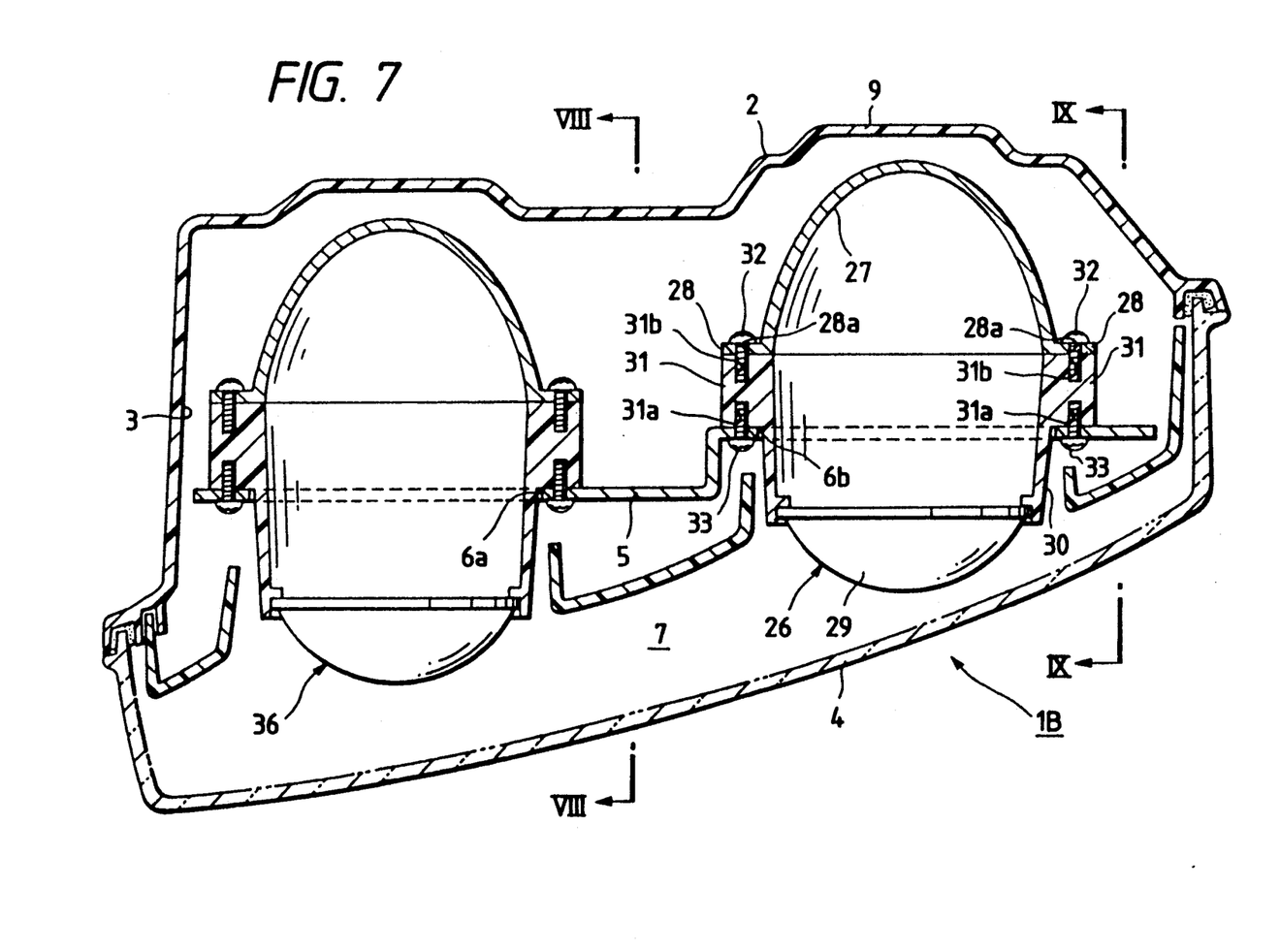
FIG. 7 is a horizontal sectional view showing a vehicular headlamp according to the third embodiment of the invention.
Figure 8:
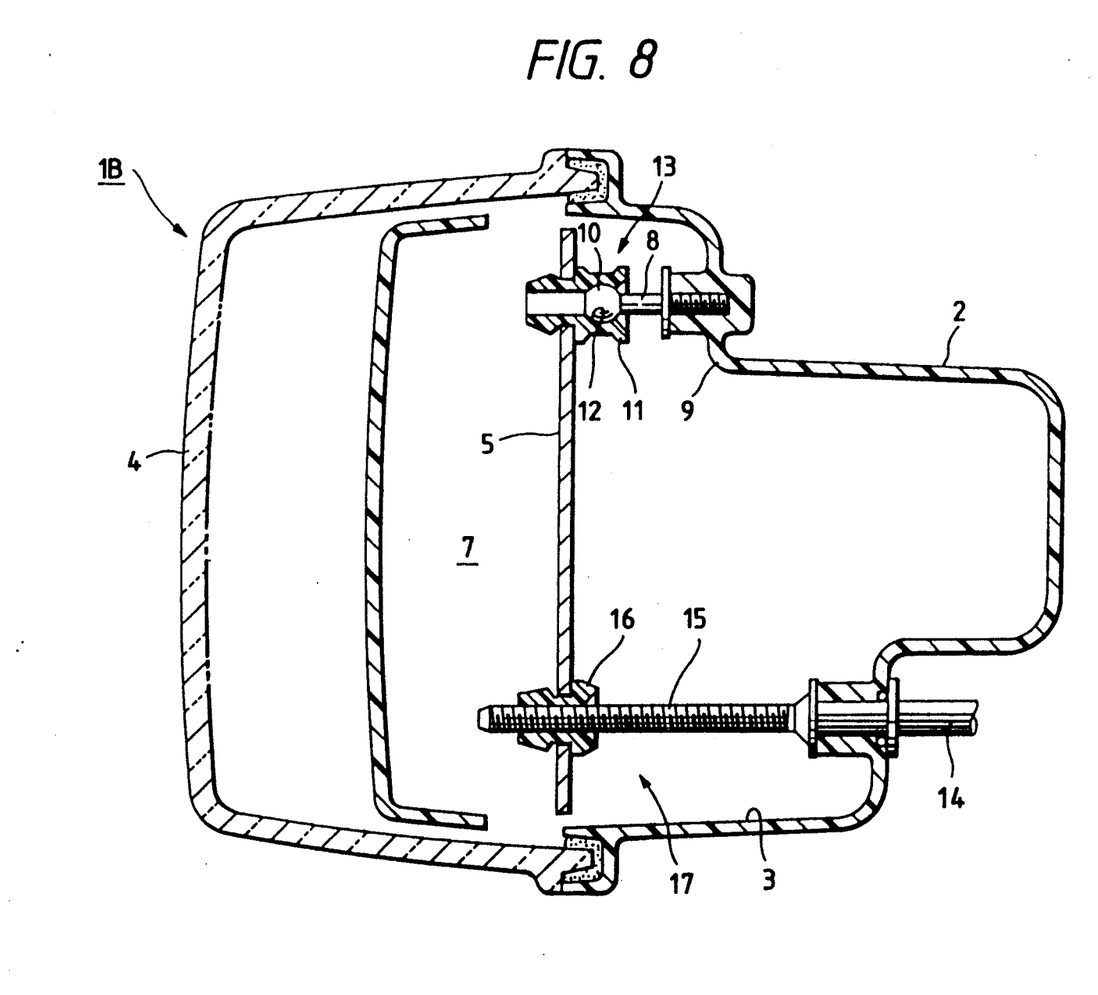
FIG. 8 is an enlarged sectional view cut along a line VIII—VIII in FIG. 4.
Figure 9:
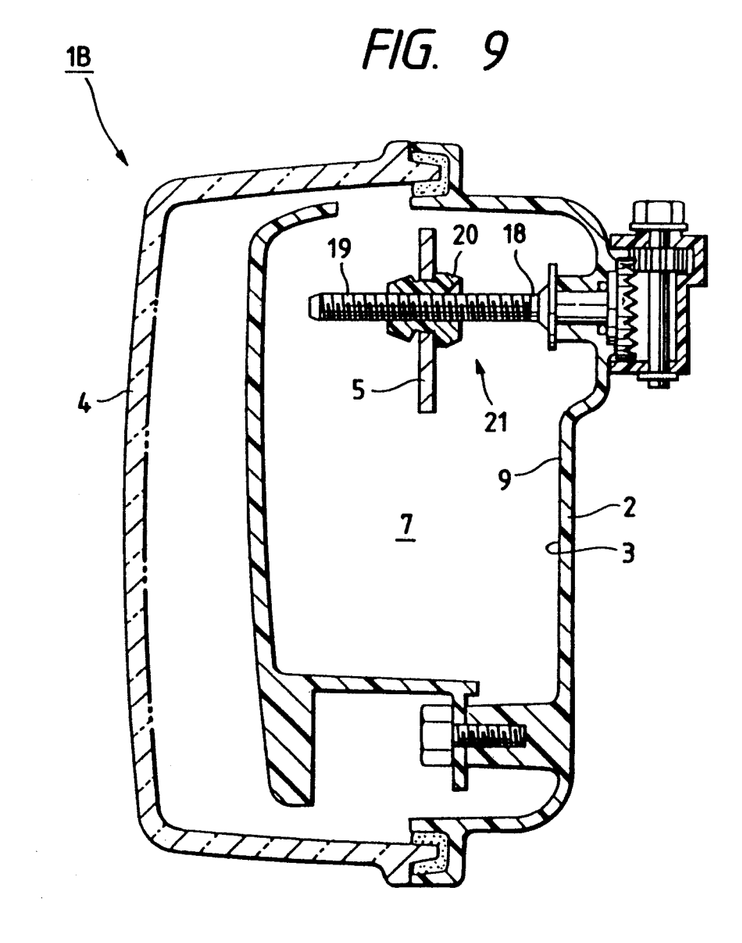
FIG. 9 is an enlarged sectional view cut along a line IX—IX in FIG. 4.

FIGS. 7-9 show a vehicular headlamp according to a third embodiment of the invention. Specifically, FIG. 7 is a horizontal sectional view showing a vehicular headlamp according to the third embodiment of the invention, FIG. 8 is an enlarged sectional view cut along a line VIII—VIII in FIG. 4, and FIG. 9 is an enlarged sectional view cut along a line IX—IX in FIG. 4

The primary difference between the first and third embodiment is that a projection type lamp 36 is employed as a main beam unit according to the third embodiment. Since the projection type lamp is compact in size, the headlamp itself can be made compact using two projection type lamps as main and sub-beam units.

Figure 10:
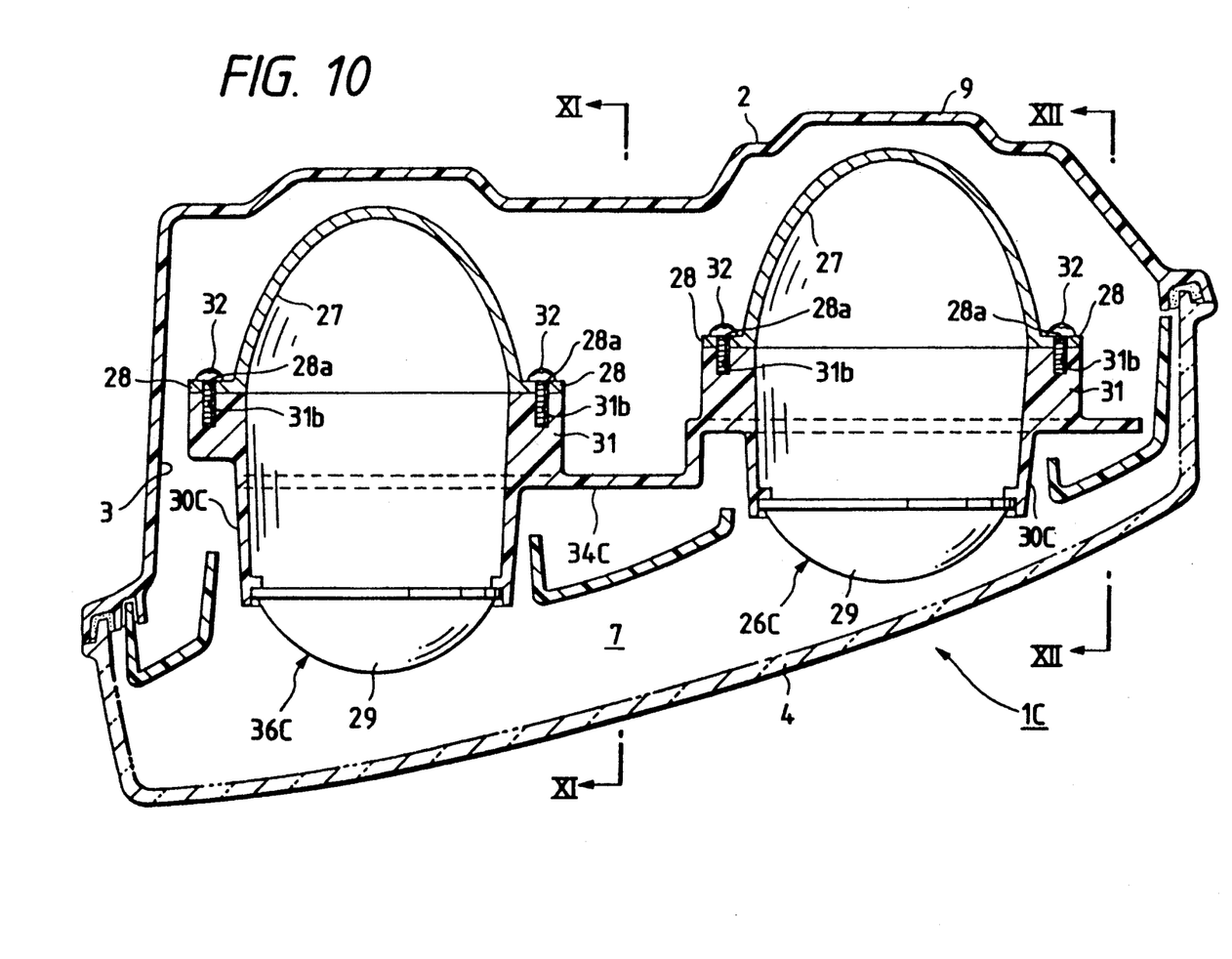
FIG. 10 is a horizontal sectional view showing a vehicular headlamp according tot he fourth embodiment of the invention.
Figure 11:
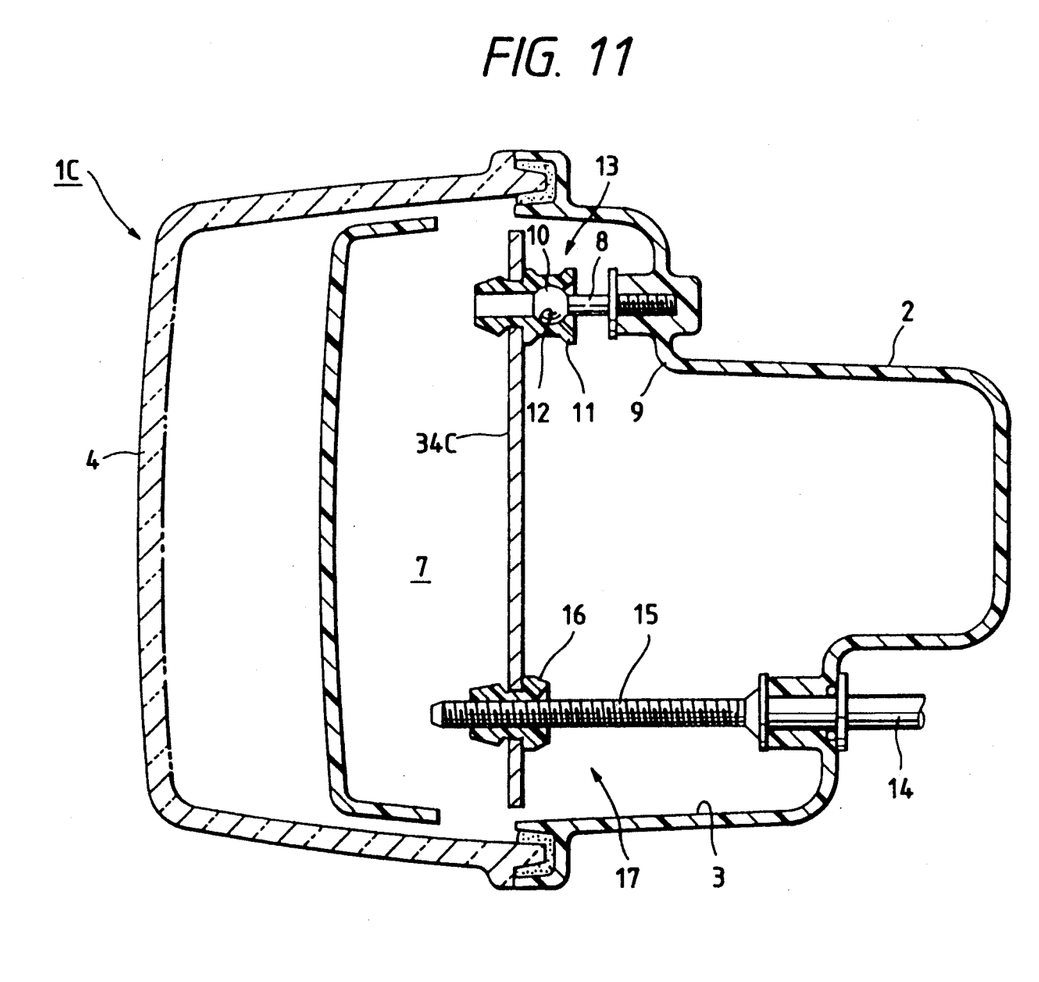
FIG. 11 is an enlarged sectional view cut along a line XI—XI in FIG. 10.
Figure 12:
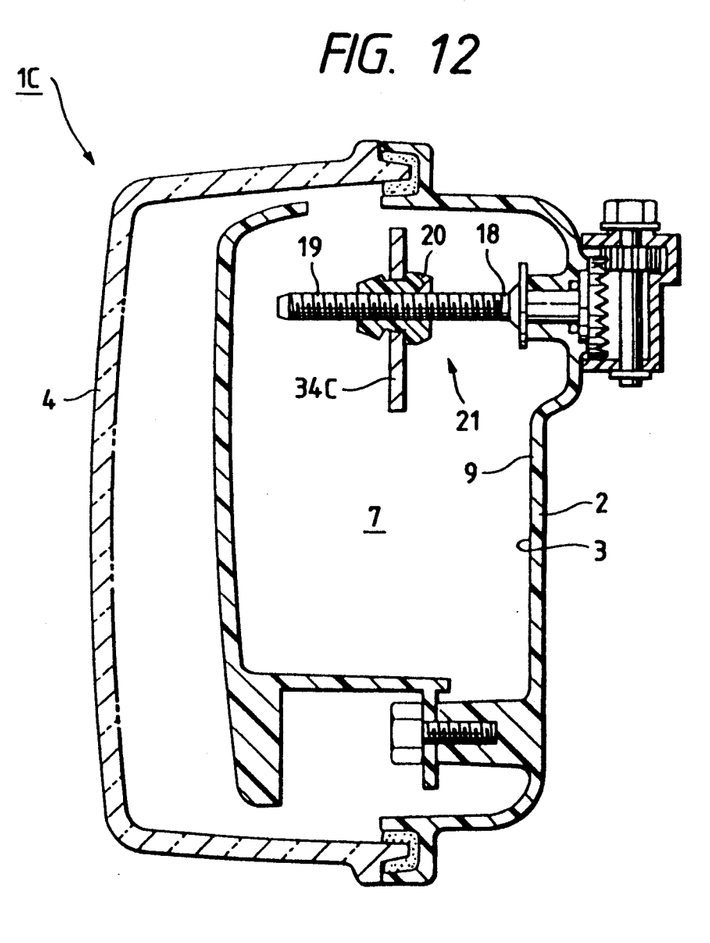
FIG. 12 is an enlarged sectional view cut along a line XII—XII in FIG. 10.

FIGS. 10 through 12 show a vehicular headlamp according to a fourth embodiment of the invention. More specifically, FIG. 10 is a horizontal sectional view showing a vehicular headlamp according to the fourth embodiment of the invention, FIG. 11 is an enlarged sectional view cut along a line XI—XI in FIG. 10, and FIG. 12 is an enlarged sectional view cut along a line XII—XII in FIG. 10.

According to the fourth embodiment, both the main beam and sub-beam units are constituted by projection type lamps 26C and 36C and a supporting plate portion 34C are unitary formed with holders 30C, 30C of the units 26C and 36C, respectively.

As described above, according to the headlamp of the present invention, since both the main beam unit and sub-beam unit are supported by a single supporting member which are pivotably disposed in a lamp room defined by the lamp body and the outer lens covering a front opening of the body, merely one pair of supporting mechanism for aiming is required. Therefore, a simple mechanism and obtain a compact headlamp can be obtained.

The above embodiments are just examples to apply the present invention and accordingly the invention is not limited thereto or thereby. The other arrangement or modification may of course be applied as far as not exceeding the scope of the invention.

What is claimed is:

1. A vehicular headlamp, comprising:
   a box-like lamp body;
   an outer cover mounted on said body for defining a lamp room with said body;
   a main beam unit accommodated in said lamp room for radiating a main beam;
   a sub-beam unit accommodated in said lamp room for radiating a sub-beam, said sub-beam unit being constituted by a first projection type lamp having an elliptic reflector, a projection lens and a holder connecting said reflector to said projection lens;
   means for supporting said main beam unit and said sub-beam unit, said supporting means pivots within said lamp room together with said main beam unit and said sub-beam unit; and an aiming means for vertically and laterally pivoting said supporting means, said aiming means comprising a first aiming mechanism for vertically pivoting said supporting means and a second aiming mechanism for laterally pivoting said supporting means, said first vertical aiming mechanism comprises:
- a pivot axis fixedly connected on a back wall of said lamp body at an upper and substantially center position in the lateral direction thereof;
- a receiving member having a concave part fixed to said supporting means at an upper center position thereof;
- a ball member unitary formed with a front end of said pivot axis, said ball member being rotatably fitted in said concave part of said receiving member;
- an adjusting shaft having a threaded portion at a front half thereof rotatably supported on said back wall of said lamp body at a position lower than the position on which said pivot axis is supported; and
- a nut member fixed to said supporting means at a position lower than the position on which said receiving member is fixed, and said threaded portion of said adjusting shaft is threadably engaged with said nut, and said second lateral aiming mechanism comprising:
- an adjusting shaft having a threaded portion at a front half thereof rotatably supported on said back wall of said lamp body at a right most position thereof horizontally spaced apart from the position on which said pivot axis is fixed; and
- a nut member secured to said supporting means, said nut member being threadably engaged with said threaded portion of said adjusting shaft.

2. The vehicular headlamp of claim 1, wherein said main beam unit is constituted by a reflector type lamp having a concave reflector.

3. The vehicular headlamp of claim 1, wherein said main beam unit is constituted by a second projection type lamp having an elliptic reflector, a projection lens and a holder connecting said reflector to said projection lens.

4. The vehicular headlamp of claim 2, wherein said supporting means is unitary formed with said first projection type lamp and said second projection type lamp.

5. The vehicular headlamp of claim 4, wherein said supporting means elongates from said holder of said first projection type lamp and being secured to said parabolic reflector.

6. The vehicular headlamp of claim 2, wherein said supporting means comprises a plate-like bracket secured to said holder of said first projection type lamp and said parabolic reflector of said parabolic type lamp.

7. The vehicular headlamp of claim 3, wherein said supporting means is unitary formed with said first projection type lamp and said second projection type lamp.

8. The vehicular headlamp of claim 7, wherein said supporting means elongates from said holder of said first projection type lamp and said holder of said second projection type lamp.

9. The vehicular headlamp of claim 3, wherein said supporting means comprises a plate-like bracket secured to said holder of said first projection type lamp and to said holder of said second projection type lamp.

10. The vehicular headlamp of claim 1, wherein said outer cover comprises lens steps.

* * * * *